United States Patent
Hulse (10) Patent No.: US 7,264,366 B2
(45) Date of Patent: *Sep. 4, 2007

(54) ILLUMINATION DEVICE FOR SIMULATING NEON OR SIMILAR LIGHTING USING PHOSPHORESCENT DYE

(75) Inventor: George R. Hulse, Arlington Heights, IL (US)

(73) Assignee: iLight Technologies, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/025,019

(22) Filed: Dec. 29, 2004

(65) Prior Publication Data

US 2005/0111236 A1 May 26, 2005

Related U.S. Application Data (63) Continuation-in-part of application No. 10/455,639, filed on Jun. 5, 2003, now Pat. No. 7,011,421, which is a continuation-in-part of application No. 09/982,705, filed on Oct. 18, 2001, now Pat. No. 6,592,238.

(60) Provisional application No. 60/533,581, filed on Dec. 31, 2003.

(51) Int. Cl.
*F21V 9/16* (2006.01)
(52) U.S. Cl. ................. 362/84; 362/231; 362/249
(58) Field of Classification Search ............ 362/84, 362/231, 245, 249, 552, 558, 610, 612, 615, 362/26, 27
See application file for complete search history.

(56) References Cited

U.S. PATENT DOCUMENTS 1,150,118 A    8/1915    Hewitt (Continued)

FOREIGN PATENT DOCUMENTS

CA    2 282 819    3/2001

(Continued)

OTHER PUBLICATIONS ifire Technology Press Release Westaim's iFire Technology demonstrates high-luminance Colory-by-Blue™, May 20, 2003, downloaded at http://www.ifire.com/NewsCentre/Press ReleaseDetails.aspx?id=56 on Aug. 5, 2003.

(Continued)

*Primary Examiner*—Y. My Quach-Lee
(74) *Attorney, Agent, or Firm*—Stites & Harbison, PLLC; David W. Nagle, Jr.; Jeffrey A. Haeberlin (57) ABSTRACT

An illumination device simulates neon lighting using a light source for emitting light of a predetermined first hue and a light-transmitting medium having a predetermined density of phosphorescent dye positioned adjacent to the light source. The phosphorescent dye will absorb light emitted by the light source and emit light of a second hue. An observer of the device perceives light that is of a hue that is different from the predetermined first hue. A means for varying the intensity of the light emitted by the light source creates color changing effects in the illumination device. Light-emitting diodes (LEDs) are a suitable light source. A waveguide having both optical waveguide and light scattering properties is used to diffuse the combined light and simulate the uniform appearance of a neon tube. Alternatively, the waveguide itself can be doped with phosphorescent dye to emit light having the perceived hue.

25 Claims, 7 Drawing Sheets

U.S. PATENT DOCUMENTS

| | | | |
|---|---|---|---|
| 1,275,871 A | 8/1918 | Dodds et al. | |
| 1,312,312 A | 8/1919 | Dodds | |
| 1,313,622 A | 8/1919 | Dodds | |
| 1,385,778 A | 7/1921 | Dodds | |
| 2,604,711 A | 7/1952 | Porter | |
| 3,780,462 A | 12/1973 | Pregel et al. | |
| 4,382,272 A | 5/1983 | Quella et al. | |
| 4,884,680 A | 12/1989 | Israel et al. | |
| 4,912,605 A | 3/1990 | Whitehead | |
| 5,607,222 A | 3/1997 | Woog | |
| 5,654,552 A | 8/1997 | Toombs | |
| 5,757,111 A | 5/1998 | Sato | |
| 5,810,463 A | 9/1998 | Kawahara et al. | |
| 6,059,438 A | 5/2000 | Smith et al. | |
| 6,183,102 B1 | 2/2001 | Mortz et al. | |
| 6,276,634 B1 | 8/2001 | Bodle | |
| 6,345,903 B1 | 2/2002 | Koike et al. | |
| 6,350,041 B1 * | 2/2002 | Tarsa et al. | 362/231 |
| 6,361,186 B1 | 3/2002 | Slayden | |
| 6,412,971 B1 * | 7/2002 | Wojnarowski et al. | 362/249 |
| 6,554,448 B2 | 4/2003 | Carpenter et al. | |
| 6,676,284 B1 | 1/2004 | Wilson | |
| 6,784,603 B2 | 8/2004 | Pelka et al. | |
| 6,828,043 B2 | 12/2004 | Sturley | |
| 6,860,628 B2 * | 3/2005 | Robertson et al. | 362/800 |
| 7,011,421 B2 * | 3/2006 | Hulse et al. | 362/84 |
| 2001/0043467 A1 | 11/2001 | Carpenter et al. | |
| 2002/0043938 A1 | 4/2002 | Lys | |
| 2002/0145874 A1 * | 10/2002 | Kahl | 362/84 |
| 2003/0085642 A1 | 5/2003 | Pelka et al. | |
| 2003/0095401 A1 | 5/2003 | Hanson et al. | |
| 2003/0189823 A1 | 10/2003 | George et al. | |
| 2004/0076395 A1 | 4/2004 | Poisel et al. | |
| 2004/0154199 A1 | 8/2004 | Robinson et al. | |
| 2004/0202893 A1 | 10/2004 | Abe | |
| 2004/0244247 A1 | 12/2004 | Bolta | |
| 2006/0028837 A1 * | 2/2006 | Mrakovich | 362/612 |

FOREIGN PATENT DOCUMENTS

| | | |
|---|---|---|
| EP | 0982924 | 3/2000 |
| WO | 02/065016 | 8/2002 |
| WO | 02070948 | 9/2002 |

OTHER PUBLICATIONS

IPEA/US, International Preliminary Examination Report, Oct. 7, 2004, pp. 1-4.

Neher, Dieter et al., Arbeitsgebiete und Methoden, Research fields, pp. 1-8, downloaded at http://www.uni-potsdam.de/u/physik/exphy/arbeit_eng.htm on Dec. 3, 2004.

European Patent Office, Supplementary European Search Report, Oct. 2, 2006, pp. 1-3, Munich, Germany.

European Patent Office, Supplementary European Search Report, Feb. 20, 2007.

* cited by examiner

ILLUMINATION DEVICE FOR SIMULATING NEON OR SIMILAR LIGHTING USING PHOSPHORESCENT DYE

CROSS-REFERENCE TO RELATED APPLICATIONS

The present application claims priority to U.S. Provisional Application Ser. No. 60/533,581 filed Dec. 31, 2003 and is a continuation-in-part of U.S. Utility application Ser. No. 10/455,639 filed Jun. 5, 2003, now U.S. Pat. No. 7,011,421, which is a continuation-in-part of U.S. Utility application Ser. No. 09/982,705, filed on Oct. 18, 2001, now U.S. Pat. No. 6,592,238, the entire disclosures of which are incorporated herein by reference.

BACKGROUND OF THE INVENTION

The present invention relates to an illumination device for simulating neon or similar lighting using a light source and phosphorescent dye. The illumination device may also include a means for varying the intensity of the light source to produce certain color changing effects.

Neon lighting, which is produced by the electrical stimulation of the electrons in the low-pressure neon gas-filled glass tube, has been a main stay in advertising and for outlining channel letters and building structures for many years. A characteristic of neon lighting is that the tubing encompassing the gas has an even glow over its entire length irrespective of the viewing angle. This characteristic makes neon lighting adaptable for many advertising applications, including script writing and designs, because the glass tubing can be fabricated into curved and twisted configurations simulating script writing and intricate designs. The even glow of neon lighting being typically devoid of hot spots allows for advertising without visual and unsightly distractions. Thus, any illumination device that is developed to duplicate the effects of neon lighting must also have even light distribution over its length and about its circumference. Equally important, such lighting devices must have a brightness that is at least comparable to neon lighting. Further, since neon lighting is a well-established industry, a competitive lighting device must be lightweight and have superior "handleability" characteristics in order to make inroads into the neon lighting market. Neon lighting is recognized as being fragile in nature. Because of the fragility and heavy weight, primarily due to its supporting infrastructure, neon lighting is expensive to package and ship. Moreover, it is extremely awkward to initially handle, install, and/or replace. Any lighting device that can provide those previously enumerated positive characteristics of neon lighting, while minimizing its size, weight, and handleability shortcomings, will provide for a significant advance in the lighting technology.

The recent introduction of lightweight and breakage resistant point light sources, as exemplified by high-intensity light-emitting diodes (LEDs), have shown great promise to those interested in illumination devices that may simulate neon lighting and have stimulated much effort in that direction. However, the twin attributes of neon lighting, uniformity and brightness, have proven to be difficult obstacles to overcome as such attempts to simulate neon lighting have largely been stymied by the tradeoffs between light distribution to promote the uniformity and brightness.

In an attempt to address some of the shortcomings of neon, commonly assigned U.S. Pat. No. 6,592,238, which is incorporated in its entirety herein by this reference, describes an illumination device comprising a profiled rod of material having waveguide properties that preferentially scatters light entering one lateral surface ("light-receiving surface") so that the resulting light intensity pattern emitted by another lateral surface of the rod ("light-emitting surface") is elongated along the length of the rod. A light source extends along and is positioned adjacent the light-receiving surface and spaced from the light-emitting surface a distance sufficient to create an elongated light intensity pattern with a major axis along the length of the rod and a minor axis that has a width that covers substantially the entire circumferential width of the light-emitting surface. In a preferred arrangement, the light source is a string of point light sources spaced a distance apart sufficient to permit the mapping of the light emitted by each point light source into the rod so as to create elongated and overlapping light intensity patterns along the light-emitting surface and circumferentially about the surface so that the collective light intensity pattern is perceived as being uniform over the entire light-emitting surface.

One of the essential features of the illumination device described and claimed in U.S. Pat. No. 6,592,238 is the uniformity and intensity of the light emitted by the illumination device. While it is important that the disadvantages of neon lighting be avoided (for example, weight and fragility), an illumination device would have little commercial or practical value if the proper light uniformity and intensity could not be obtained. This objective is achieved primarily through the use of a "leaky" waveguide rod. A "leaky" waveguide is a structural member that functions both as an optical waveguide and light scattering member. As a waveguide, it tends to preferentially direct light entering the waveguide, including the light entering a lateral surface thereof, along the axial direction of the waveguide, while as a light scattering member, it urges the light out of an opposite lateral surface of the waveguide. As a result, what is visually perceived is an elongated light pattern being emitted along the light-emitting lateral surface of the waveguide.

Nevertheless, a problem with illumination devices using leaky waveguides and LEDs, as described and claimed in U.S. Pat. No. 6,592,238, is that the available visible color spectrum is limited by the finite availability of LED colors.

Therefore, in commonly assigned and co-pending U.S. patent application Ser. No. 10/455,639, an application which is also incorporated in its entirety herein by this reference, an illumination device is described that uses fluorescent dyes, thus allowing for emission of light in colors that cannot ordinarily be achieved by use of LEDs alone without significant increase in cost or complexity of the illumination device. Specifically, the illumination device is generally comprised of a rod-like member, a housing, and a light source. In one preferred embodiment, the rod-like member is a waveguide that has an external curved lateral surface serving as a light-emitting surface and an interior lateral surface that serves as a light-receiving surface, such that light entering the waveguide from the light source positioned below the light-receiving surface is scattered within the waveguide so as to exit with diffused distribution out of the curved lateral surface. The housing preferably comprises a pair of side walls that define an open-ended channel that extends substantially the length of the waveguide. The housing generally functions to house the light source and associated electrical accessories, and also preferably serves to collect and reflect light.

Although it is contemplated that various types of light sources could be incorporated into the illumination device described in U.S. patent application Ser. No. 10/455,639, a string or strings of contiguously mounted high-intensity light-emitting diodes (LEDs) is a preferred light source. However, since the available color spectrum of an illumination device incorporating LEDs as the light source is limited by the finite availability of LED colors or hues, the illumination device is constructed so as to provide for emission of light with a perceived color or hue that is different than that of the LED itself. Specifically, this is accomplished through the incorporation of a light color or hue conversion system into the illumination device, specifically an intermediate light-transmitting medium extending along and positioned adjacent the light source. This intermediate light-transmitting medium is preferably composed of a substantially translucent acrylic, polyurethane or similar material tinted with a predetermined combination of one or more fluorescent dyes. Because of the position of the intermediate light-transmitting medium adjacent the light source, light emitted from the light source is directed into the intermediate light-transmitting medium and interacts with the fluorescent dyes contained therein. This light is partially absorbed by each of the fluorescent dyes of the intermediate light-transmitting medium, and light having a lower energy color or hue is then emitted from each of the fluorescent dyes and into the light-receiving surface of the waveguide. Thus, through selection of appropriate combinations of dyes and varying the density of the dyes within the intermediate light-transmitting medium, colors or hues across the visible spectrum can be produced, colors or hues that are ultimately observed along the light-emitting surface of the waveguide.

It is a paramount object of the present invention to provide an illumination device similar to that described in U.S. patent application Ser. No. 10/455,639, but capable of producing a number of effects through the use of phosphorescent dye. More specifically, the effects include: providing an illumination device that provides light output for a period of time after a power failure; providing an illumination device that alternates between two colors; and providing an illumination device that continuously varies between a range of colors.

This object and other objects and advantages of the present invention will become readily apparent and addressed through a reading of the discussion below and a review of the appended drawings.

SUMMARY OF THE PRESENT INVENTION

The present invention is an illumination device having a light source for emitting light of a predetermined first hue and a light-transmitting medium. The light-transmitting medium has a predetermined density of phosphorescent dye. The light-transmitting medium is positioned adjacent the light source such that an observer of the device perceives light that is of a hue that is different from the predetermined first hue. Thus, the light-transmitting medium acts as a color conversion system.

Preferably, the illumination device also includes a means for varying the intensity the light emitted by said light source, such that the perceived hue varies with a state of the light source. The means for varying the intensity of the light emitted by the light source could be a control device controlling a waveform of a power signal to said light source, including the shape, duty cycle, amplitude, and frequency of the power signal waveform. The shape of the power signal waveform could be, for example, a square wave or a sine wave.

In accordance with a preferred embodiment, the light source is a plurality of light-emitting diodes (LEDs). Still further, the light-emitting diodes are arranged in an elongated pattern.

Advantageously, the illumination device further has a waveguide positioned adjacent the light-transmitting medium. The waveguide is a substantially rod-like member having a light-receiving surface and a light-emitting surface. Further, the waveguide has both optical waveguide and light scattering properties. The light of the first hue and the light of the second hue are received by the light-receiving surface, and the perceived light is emitted from the light emitting surface.

In accordance with an important implementation, the light-transmitting medium is composed of a matrix of substantially translucent material doped with the predetermined density of phosphorescent dye. Then, several configurations are possible. In one configuration, a portion of the light emitted by the light source is transmitted through the light-transmitting medium without absorption by said dye. In another configuration, a portion of the light emitted by the light source passes around the light-transmitting medium and reaches the waveguide directly, without passing through the light-transmitting medium. In yet another configuration, the light-transmitting medium has a first region that is substantially transparent, a second region that is doped with the predetermined density of a first phosphorescent dye, and a third region that is doped with a predetermined density of a second phosphorescent dye. Therefore, the perceived light of this configuration is a combination of: the first hue from light emitted by said light source passing through the first region; the second hue from light emitted by the dye from the second region; and a third hue from light emitted by the dye from the third region.

In accordance with another important implementation, the light-transmitting medium and the waveguide are essentially combined into a single element. In other words, the light-transmitting medium itself has optical waveguide and light scattering properties, an interior light-receiving surface for receiving said light of the first hue emitted by the light source; and an external curved light-emitting surface for emitting light of the perceived hue that is a combination of the light of the first hue and the light of the second hue.

Advantageously, the illumination device further has a housing having a pair of side walls defining a channel. The light source is positioned within the channel, and the side walls have internal surfaces which reflect light into the light-transmitting medium.

No limitations on the invention should be taken from the preceding summary, as it is merely intended to summarize the various aspects of the invention. The invention will be better understood by reference to the following detailed description and the appended drawings and claims.

DETAILED DESCRIPTION OF EXEMPLARY EMBODIMENTS

The present invention is an illumination device for simulating neon or similar lighting using a light source and phosphorescent dye, and that also has a means for varying the intensity of the light emitted by the light source to produce certain color changing effects in the device.

Figure 1:
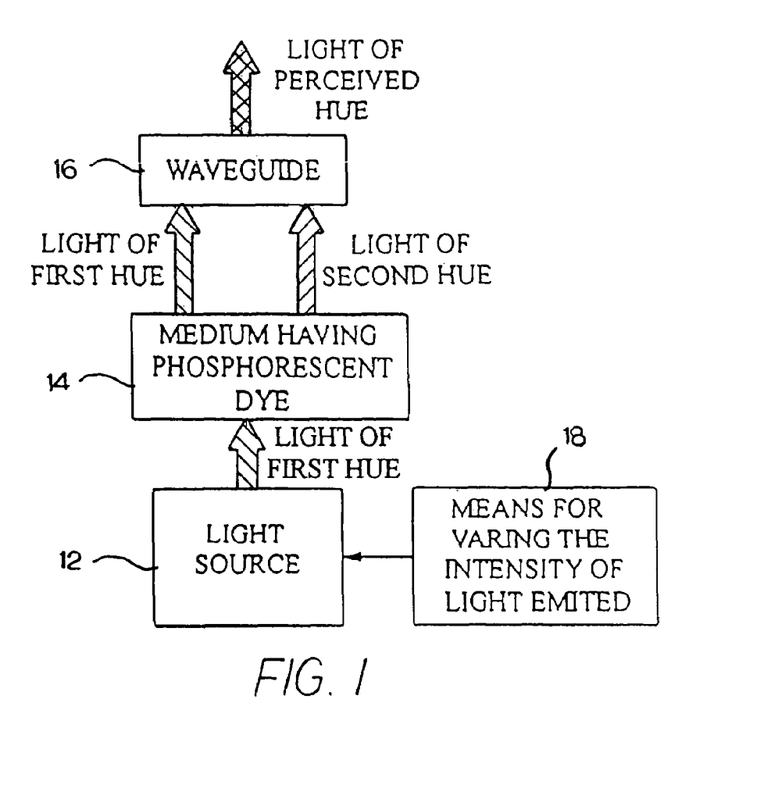
FIG. 1 is a block diagram of an exemplary illumination device according to the invention.

FIG. 1 is a block diagram of an exemplary illumination device according to the invention. The exemplary illumination device has a light source 12, a light-transmitting medium 14, a waveguide 16, and a means 18 for varying the intensity of the light emitted by light source 12.

The light source 12 is for emitting light of a first predetermined hue, as discussed above. Although it is contemplated that various types of light sources could be utilized, the preferred light source 12 is a plurality of light-emitting diodes (LEDs). Preferably, the LEDs are arranged in a series to form an elongated pattern for the simulation of neon lighting; however, alternate configurations are certainly possible within the spirit and scope of the claimed invention.

Figure 2:
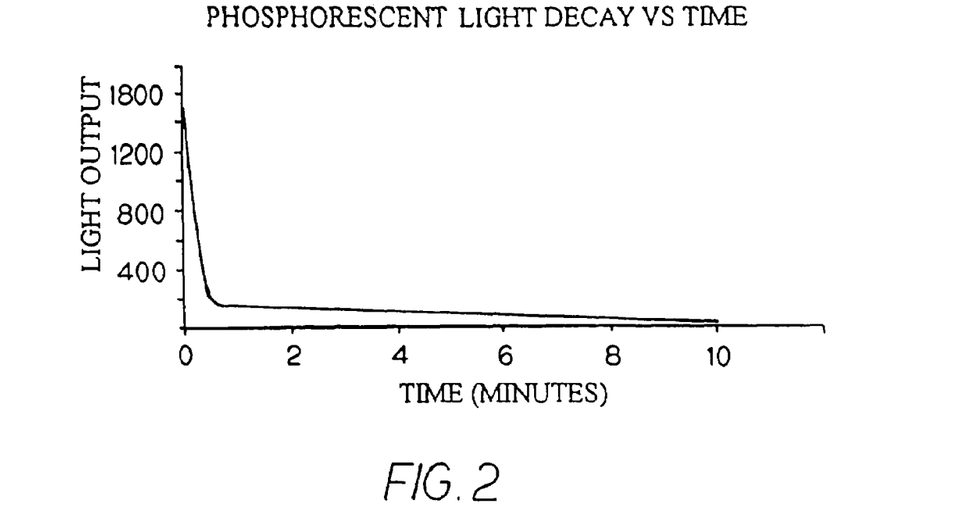
FIG. 2 is a chart of phosphorescent light decay versus time for an exemplary phosphorescent dye.

The light-transmitting medium 14 has a predetermined density of phosphorescent dye. Phosphorescent dye, similar to the fluorescent dye described above, absorbs light having a higher energy color or hue, and then emits light having a lower energy color or hue. However, unlike fluorescent dyes, which can emit their light in picoseconds, phosphorescent dyes absorb and emit light at a much slower rate. FIG. 2 is a chart of phosphorescent light decay versus time for an exemplary phosphorescent dye. Many phosphorescent dyes will continue to emit light for a long period of time, ranging from seconds to hours, after the light having a higher energy color is removed.

The light-transmitting medium 14 is positioned adjacent the light source 12 for receiving light emitted from the light source 12. Thus, the phosphorescent dye of the light-transmitting medium 14 will emit light of a second color or hue following absorption of light of the first hue from the light source 12. The light-transmitting medium 14 is further positioned such that an observer of the device perceives light that is different than the predetermined first hue of the light source 12. As shown in the embodiment of FIG. 1, if a density of phosphorescent dye is selected such that a portion of the light from the light source 12 is transmitted or "leaks" through the light-transmitting medium 14 without being absorbed by the dye, the perceived light will be of a color or hue that is a combination of the first hue and the second hue. However, if the density of phosphorescent dye is selected such that all of the light from the light source 12 is absorbed by the dye, the perceived light will be of the second color or hue only. In either case, the perceived light will be different than the predetermined first hue of the light source 12.

The waveguide 16 is positioned adjacent the light-transmitting medium 14 for receiving light of the first hue and light of the second hue. The waveguide 16 has both optical waveguide and light scattering properties, in order to mix the various light components into homogeneity and to provide a uniform light intensity pattern along the waveguide.

Figure 3:
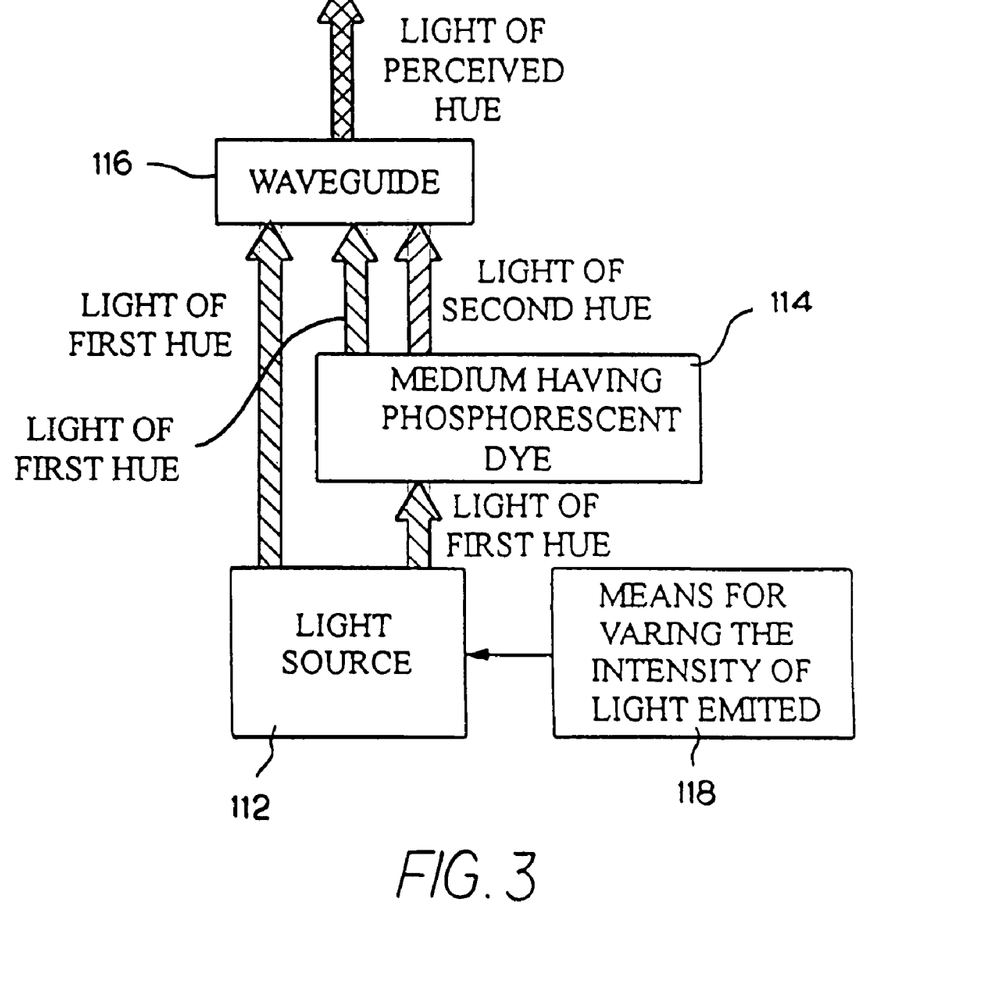
FIG. 3 is a block diagram of another exemplary illumination device according to the invention.

FIG. 3 shows another exemplary illumination device having an alternate cooperation between the light source 112, the light-transmitting medium 114, and the waveguide 116. In this configuration, a portion of the light emitted by the light source 112 passes around the light-transmitting medium 114 and reaches the waveguide 116 directly, without passing through the light-transmitting medium 114. An observer of the device would still perceive light that is of a color or hue that is a combination of the first hue and the second hue.

Figure 4:
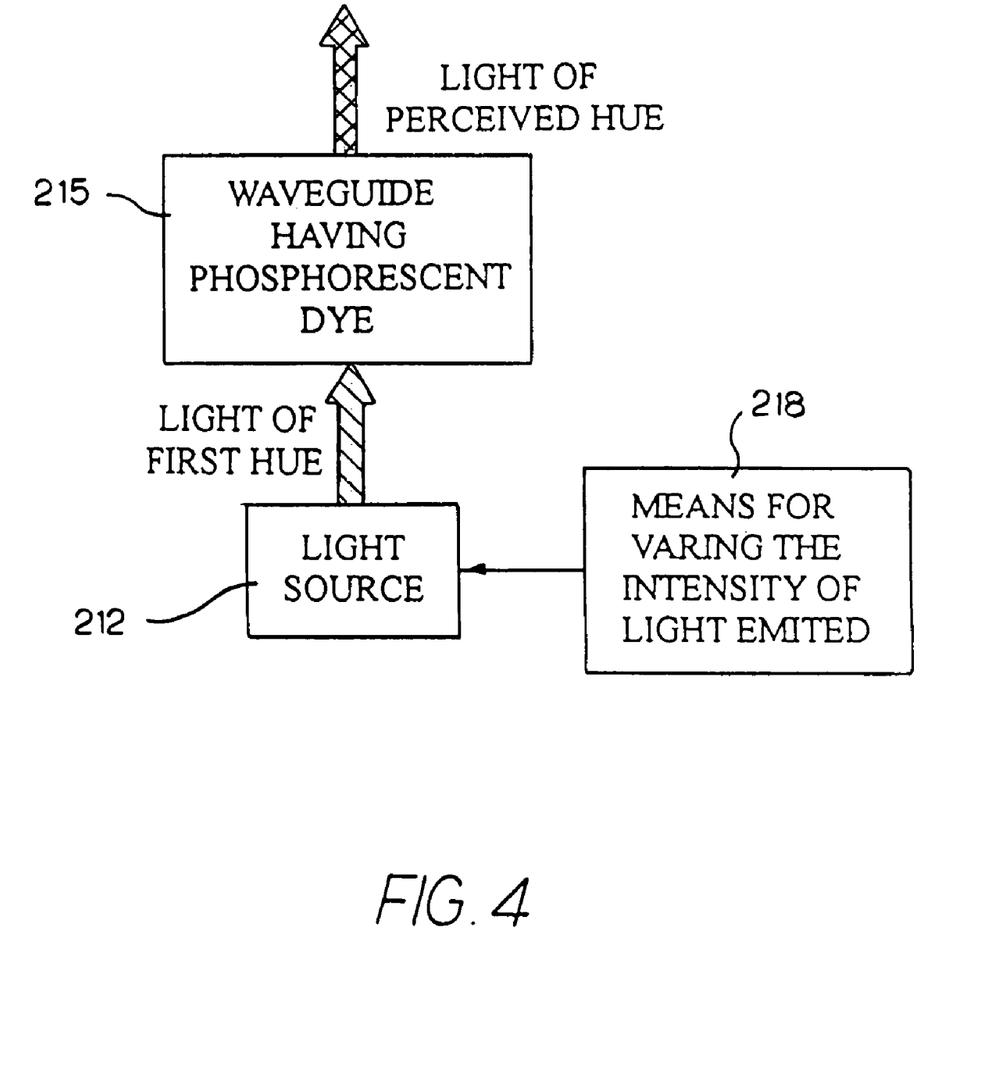
FIG. 4 is a block diagram of yet another exemplary illumination device according to the invention

FIG. 4 shows yet another exemplary illumination device, wherein the light-transmitting medium having phosphorescent dye and the waveguide are combined. Thus, the exemplary illumination device of FIG. 4 has a waveguide 215 that has a predetermined density of phosphorescent dye. The waveguide 215 has both optical waveguide and light scattering properties, and is positioned adjacent the light source 212 for receiving light of the first hue. The density of phosphorescent dye in the waveguide 215 can be selected such that the phosphorescent dye will absorb only a portion of light of the first hue and emit light of a second hue. Thus, a portion of the light of the first hue will not be absorbed by the phosphorescent dye, resulting in a perceived hue that is a combination of light of the first hue and light of the second hue. Alternatively, the density of phosphorescent dye in the waveguide 215 can be selected such that the phosphorescent dye will absorb all of the light of the first hue. Thus, the perceived hue will contain only light of the second hue emitted by the phosphorescent dye. In either case, the characteristics of the waveguide 215 will provide a uniform light intensity pattern along the waveguide 215.

Any of the exemplary illumination device configurations described herein could also have fluorescent dyes, as described in commonly assigned and co-pending U.S. patent application Ser. No. 10/455,639, in addition to the subject phosphorescent dye. Additionally, it should be understood that phosphorescent dye described could also include a combination of individual dyes. This description is intended to cover all combinations and perturbations between fluorescent and phosphorescent dyes.

Referring to the exemplary illumination device configurations shown in FIGS. 1, 3 and 4, the means 18, 118, 218 for varying the intensity of the light emitted by the light source 12, 112, 212 will create various effects of the perceived hue varying with the state of the light emitted by the light source. For instance, when the light source 12, 112, 212 is on in a continuous state, the perceived hue will be a fixed combination of the first hue and the second hue. When the light source 12, 112, 212 is then removed or switched off, the phosphorescent dye will continue to emit light in the second hue only. This characteristic could serve as a useful safety feature in the event of a power failure, where the phosphorescent dye would continue to emit light. Further, this characteristic can be utilized to produce a two color system by pulsing the light such that the perceived hue alternates between the composite hue and the second hue alone. Still further effects can be achieved by controlling the waveform of the power signal to the light source. For instance, a power signal in the shape of a sine wave having a period similar to the decay time of the phosphorescent dye will cause the intensity of the light source 12, 112, 212 to vary corresponding to the power signal. The light emitted by the phosphorescent dye will also vary in response to the varying intensity of the light source 12, 112, 212. Therefore, the perceived hue of the light emitted by the illumination device will vary with the varying intensities of the light emitted by the light source 12, 112, 212 and the light emitted by the phosphorescent dye.

Means 18, 118, 218 for varying the intensity of the light emitted by the light source 12, 112, 212 are know in the art, and include: switching power supplies; function or waveform generators; rheostats or dimmer-switches; and simple on-off switches. Such means 18 are preferably capable of generating pulses or other power signal waveforms, including square waves and sine waves. Also, such means 18, 118, 218 are most likely capable of controlling the characteristics, such as the shape, duty cycle, amplitude and frequency of the power signal waveform.

Figure 5:
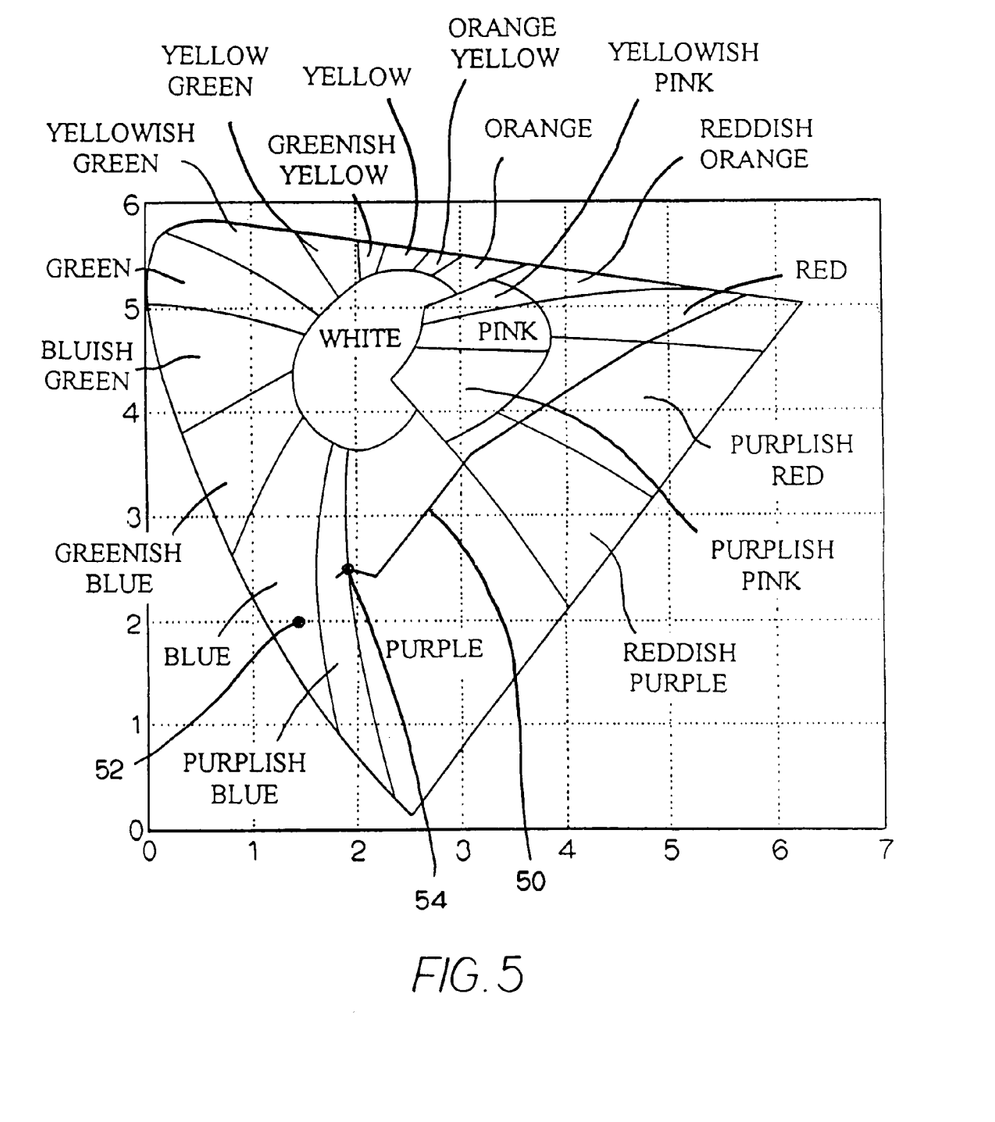
FIG. 5 is a CIE diagram tracing the perceived hue of the light emitted by an exemplary illumination device according to the invention.

For example, FIG. 5 shows a CIE diagram where a line 50 traces the perceived hue of the light emitted by an exemplary illumination device according to the invention using blue LEDs and a red phosphorescent dye. A power signal in the shape of a sine wave drives the LEDs. The period of sine wave and the decay time of the phosphorescent dye should be similar to create the color changing effect observed. The blue LEDs emit light of a first hue, represented by a first point 52. Also, a second point 54 represents the perceived hue when the LEDs are operated at a constant, full-output (or DC) state. Thus, the perceived hue line 50 indicates a perceived hue that begins as purplish blue, transitions into a series of other purplish colors, and then becomes red.

Figure 6:
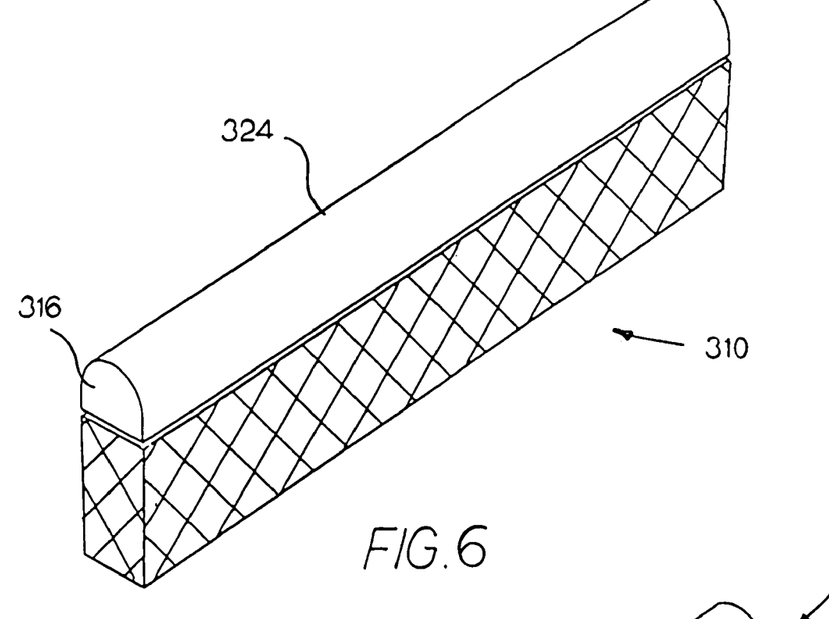
FIG. 6 is a perspective view of an exemplary illumination device according to the invention.
Figure 7:
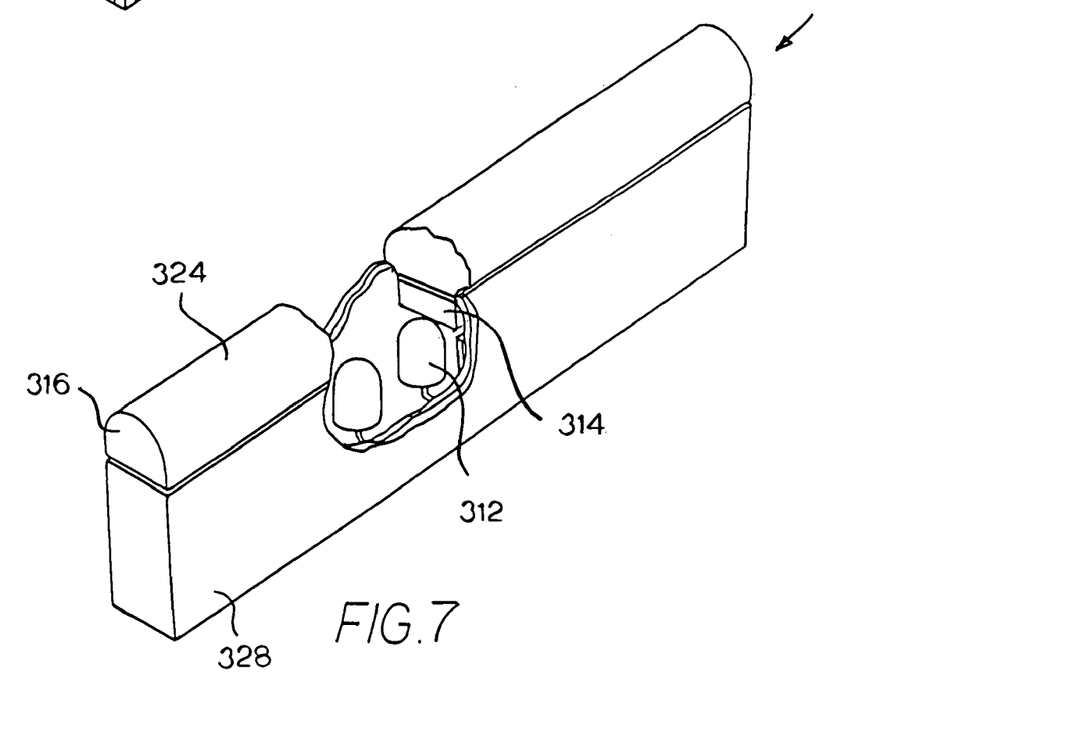
FIG. 7 is perspective view with selected portions cutaway of the exemplary illumination device of FIG. 6.
Figure 8:
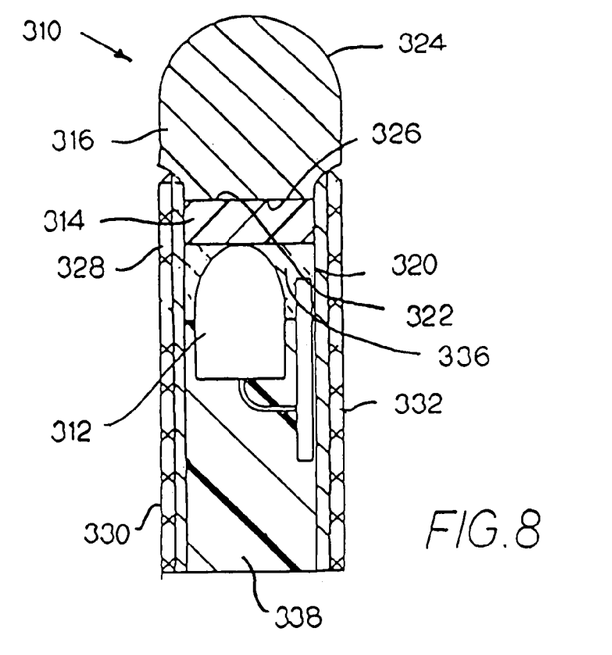
FIG. 8 is a sectional view of an exemplary illumination device according to the invention, similar to the illumination device of FIG. 6.

FIGS. 6-8 show an embodiment of an exemplary illumination device 310 according to the invention. The exemplary illumination device 310 is generally comprised of a light source 312, a light-transmitting medium 314, and a waveguide 316. A means for varying the intensity of the light emitted by the light source, as described above, would be operatively connected to the illumination device 310, but for convenience is not shown.

As mentioned above, the preferred light source 312 is a plurality of light-emitting diodes (LEDs) having a first predetermined hue. More specifically now, the LEDs utilized in the exemplary embodiment discussed herein are high-intensity, blue-colored LEDs having a hue of approximately 465-470 nm. Blue is a higher energy color in the spectrum, and the availability of high-intensity, high-output LEDs in this color makes them preferable for exciting phosphorescent dyes for emitting a range of lower-energy hues, and, therefore, producing a range of perceived hues. As shown, the LEDs can be arranged in an elongated pattern to form a string or strings of lights to facilitate the simulation of a neon tube. For example, the LEDs can be mounted on a circuit board in a substantially linear array or series, as shown.

The light-transmitting medium 314 of the exemplary illumination device 310 is an intermediate member extending along and positioned adjacent the light source 312. The light-transmitting medium 314, as shown, has a light-receiving surface 320 for receiving light emitted from said light source 312 and a light-emitting surface 322 for emitting light into the waveguide 316. Thus, the light-transmitting medium 314 is, in effect, a color conversion system where the phosphorescent dye absorbs light of a first hue emitted by said light source 312, and emits light of a second, lower-energy hue. By selecting a density of phosphorescent dye that will allow a portion of the light from the light source 312 to be transmitted or "leak" through the light-transmitting medium 314 without being absorbed by the dye, light observed along the light-emitting surface 322 of the light color conversion system will be perceived as having a color or hue different that the light of the first predetermined hue.

The light-transmitting medium 314 is preferably composed of a matrix of a substantially translucent acrylic, polyurethane, or similar material doped or tinted with a predetermined density of the phosphorescent dye. A preferred polyurethane for this application is a polyurethane manufactured and distributed by IPN Industries, Inc. of Haverhill, Mass. under trade name EGA-202. An exemplary dye is CP2-35 Fire Red Acrylic Lacquer glow-in-the-dark paint, manufactured and distributed by Risk Reactor of Huntington Beach, Calif. However, alternate configurations of the light-transmitting medium 314 and other dyes or combinations of dyes are possible and covered under both the spirit and the scope of the claimed invention.

Further, the phosphorescent dye of the light-transmitting medium 314 will continue to emit some amount of the lower-energy light even after the light source 312 stops emitting. Thus, if there is a power failure, the illumination device 310 will continue to provide some illumination from the phosphorescent dye of the intermediate light-transmitting medium 314, which is a useful safety feature.

The waveguide 316 is a substantially rod-like member that preferably has an external curved surface 324 serving as a light-emitting surface and an interior surface 326 that serves as a light-receiving surface. Light entering the waveguide 316 from the light-transmitting medium 314 positioned below the light-receiving surface 324 is scattered within the waveguide 316 so as to exit with a diffused distribution out of the external curved surface 324. The external curved surface 324 aids in simulating the appearance of a neon tube.

A housing 328 preferably comprises a pair of side walls 330, 332 that define an open-ended channel that extends substantially the length of waveguide 316. The housing 328 generally functions to house the light source 312 and associated electrical accessories (e.g., a circuit board). Further, the side walls 330, 332 may have internal surfaces having collection surfaces for collecting and reflecting light into said light-transmitting medium 314. In the exemplary embodiment best shown in FIG. 8, the channel defined by the housing 328 is partially filled with a white potting compound 338 below the light source 312 to reflect light upwardly toward the waveguide 316. A portion of the volume of the open-ended channel is also filled with a translucent potting compound 336 that partially encapsulates the light source 312 and maintains the position of the light source 312 relative to the housing 328. When such a translucent potting compound 336 is incorporated into an illumination device 310 constructed in accordance with the present invention, the potting compound 336 should have an index of refraction essentially matching the index of refraction of the light source 312 to minimize Fresnel losses at the interface.

Figure 9:
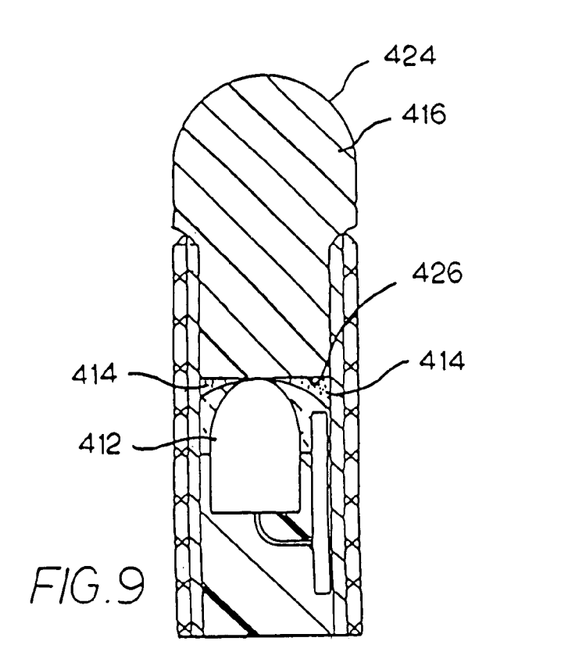
FIG. 9 is a sectional view of an alternate embodiment of an illumination device according to the invention.

In an alternate embodiment shown in FIG. 9, a coating 414 containing phosphorescent dye is applied to the internal surface 426 of the waveguide 416. In another similar, but not shown, embodiment a coating containing phosphorescent dye could be applied to the external curved surface 424 of the waveguide 416. In yet another similar, but not shown, embodiment, the waveguide 416 itself could be doped with said phosphorescent dye. In all of the described embodiments, light emitted by the device will be perceived as having a color or hue different than the light of the first hue of the light source 412.

Figures 10A, 10B:
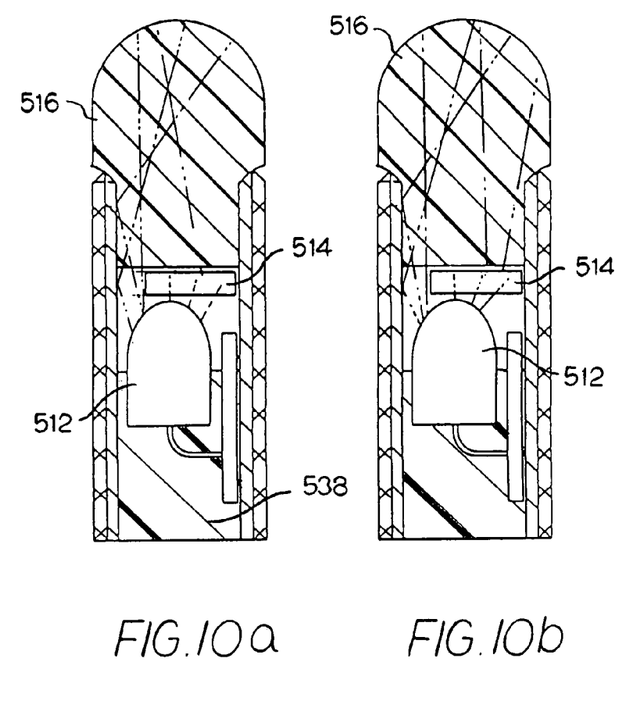
FIGS. 10a-10c are sectional views of another alternate embodiment of an illumination device according to the invention, illustrating various states of operation.
Figure 10C:
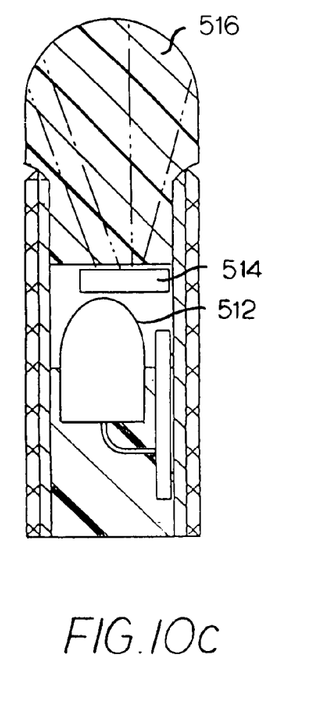

FIGS. 10*a*-10*c* show another alternate embodiment having a light source 512, a light-transmitting medium 514 and a waveguide 516, where a portion of the light emitted by the light source 512 passes around the light-transmitting medium 514 and reaches the waveguide 516 directly. FIG. 10*a* shows an initial state where the light source 512 is first turned on, the phosphorescent dye in the light-transmitting medium 514 is "charging", and a portion of the light emitted by the light source 512 passes around the light-transmitting medium 514 and reaches the waveguide 516 directly. The light emitted by the device will be perceived as having a hue favoring the first hue of the light source. FIG. 10*b* shows a state where the light source 512 and the phosphorescent dye in the light-transmitting medium 514 are both emitting light into the waveguide 516. The light emitted by the device will be perceived as having a hue that is a combination of the first hue of the light source and the second hue of the phosphorescent dye. FIG. 10*c* shows a state where the light source 512 has just been turned off, and the phosphorescent dye continues to emit or "discharge" light of a second hue. Thus, by varying the intensity of the light emitted by the light source 512 and timing it with the charging and discharging of the phosphorescent dye, the light emitted by the device will be perceived as having a hue that is a combination of the intensities of the first hue of the light source and the second hue of the phosphorescent dye.

Figure 11:
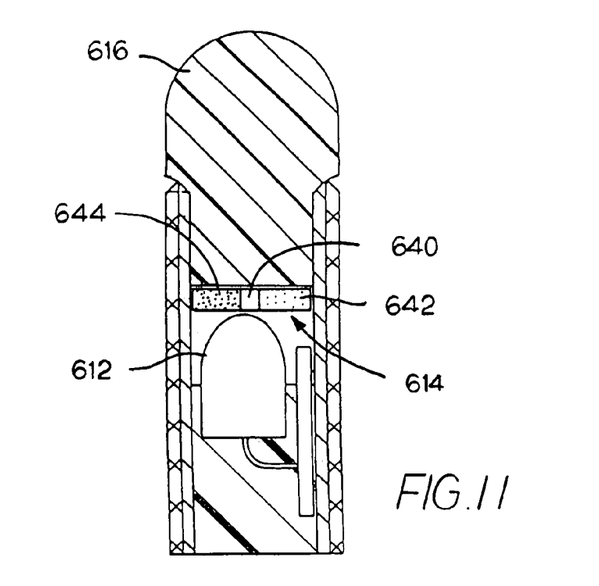
FIG. 11 is a sectional view of yet another alternate embodiment of an illumination device according to the invention.

FIG. 11 shows yet another alternate embodiment having a light source 612, a light transmitting medium 614 and a waveguide 616, where the light-transmitting medium 614 has a first region 640 that is substantially transparent, a second region 642 that is doped with a predetermined density of a first phosphorescent dye, and a third region 644 that is doped with a predetermined density of a second phosphorescent dye.

Several effects can be achieved with this configuration. First, doping the second region 642 with a long-lived (i.e., slow emitting) red emitting phosphorescent dye and doping the third region 644 with a shorter-lived (i.e., more quickly emitting) red emitting phosphorescent dye will enhance the red characteristic of the perceived light and stretch it out. Second, doping the second region 642 with a red emitting phosphorescent dye, doping the third region 644 with a green or yellow emitting phosphorescent dye, and using blue LEDs will, in effect, create a red, green, blue, or a red, yellow, blue system allowing a larger range of perceived colors, including white.

It will be obvious to those skilled in the art that other modifications may be made to the embodiments as described herein without departing from the spirit and scope of the present invention.

The invention claimed is:

1. An illumination device for simulating neon or similar lighting comprising:
   a light source for emitting light of a predetermined first hue;
   a light-transmitting medium having a predetermined density of phosphorescent dye, said light-transmitting medium positioned adjacent said light source for receiving said light of said first hue, converting a portion of said light of said first hue to a second hue, emitting light of said second hue, and transmitting a portion of said light of said first hue without conversion by said dye; and
   an elongated, rod-like waveguide positioned adjacent said light-transmitting medium, said waveguide having a light-receiving surface and a light-emitting surface, said waveguide having both optical waveguide and light scattering properties, whereby said light of said first hue and light of said second hue are received by said light-receiving surface, mixed to create a perceived hue and a substantially uniform intensity, and emitted at said light-emitting surface to simulate neon lighting.

2. The illumination device of claim 1, and further comprising a means for varying the intensity of the light emitted by said light source, such that the perceived hue varies with a state of the light source.

3. The illumination device of claim 2, wherein said means for varying the intensity of the light emitted by the light source is a control device controlling a waveform of a power signal to said light source, including the shape, duty cycle, amplitude, and frequency of the power signal waveform.

4. The illumination device of claim 3, wherein said waveform of the power signal to said light source is selected from the group consisting of: square wave and sine wave.

5. The illumination device of claim 1, wherein said light source is a plurality of light-emitting diodes (LEDs).

6. The illumination device of claim 1, wherein said light-transmitting medium is composed of a matrix of substantially translucent material doped with said predetermined density of phosphorescent dye.

7. The illumination device of claim 6, wherein a portion of the light emitted by the light source passes around the light-transmitting medium and reaches said waveguide directly, without passing through said light-transmitting medium.

8. The illumination device of claim 1, wherein said light-transmitting medium is composed of a matrix of substantially translucent material having a first region that is substantially transparent, a second region that is doped with said predetermined density of a first phosphorescent dye, and a third region that is doped with a predetermined density of a second phosphorescent dye, such that said perceived hue is a combination of:
   said first hue from light emitted by said light source passing through said first region;
   said second hue from light emitted by said dye from said second region; and
   a third hue from light emitted by said dye from said third region.

9. The illumination device of claim 1, and further comprising a housing having a pair of side walls defining a channel, said side walls having internal surfaces, said light source being positioned within said channel, said internal surfaces reflecting light into said light-transmitting medium.

10. An illumination device, comprising:
   a plurality of light-emitting diodes emitting light of a predetermined first color; and
   a light color conversion system, including:
      a light-receiving surface positioned adjacent said light-emitting diodes;
      a light-emitting surface; and
      phosphorescing dye emitting light of a predetermined hue following absorption of light from said light-emitting diodes, wherein light observed along the light-emitting surface of said light color conversion system is perceived as having a color different than the predetermined first color of light emitted by said light-emitting diodes; and a substantially rod-like member having a predetermined length, a light-receiving surface and a light-emitting surface, said rod-like member being composed of a material that has both optical waveguide and light scattering properties, the light-receiving surface of said rod-like member being positioned adjacent the light-emitting surface of said light color conversion system for receiving light from the light-emitting surface of the light color conversion system, the light-emitting surface of the rod-like member for emitting said light with a substantially uniform intensity distribution to simulate neon lighting.

11. The illumination device as recited in claim 10, and further comprising a means for varying the intensity of the light emitted by said plurality of light-emitting diodes, wherein said rod-like member is further for emitting said light with a perceived color that varies with a state of the light-emitting diodes.

12. The illumination device as recited in claim 11, wherein said means for varying the intensity of the light emitted by said plurality of light-emitting diodes is a device for controlling a waveform of a power signal to said light-emitting diodes.

13. An illumination device, comprising:
a light source emitting light of a predetermined first hue;
a substantially rod-like member having a predetermined length and positioned adjacent said light source, said member being composed of a material that has both optical waveguide and light scattering properties so as to preferentially scatter light along the length of said rod-like member; and
a light-transmitting medium generally composed of a matrix of light-transmitting material and a phosphorescing dye, said light-transmitting medium including a light-receiving surface for receiving light emitted from said light source and a light-emitting surface for emitting light into said rod-like member, said phosphorescing dye emitting light of a second hue following absorption of light from said light source, wherein a collective light ultimately emitted from said rod-like member has a substantially uniform intensity along the length of said rod-like member.

14. The illumination device as recited in claim 13, wherein said light source is a plurality of light-emitting diodes.

15. The illumination device as recited in claim 13, and further comprising a means for varying the intensity of the light emitted by said light source.

16. The illumination device as recited in claim 15, wherein said means for varying the intensity of the light emitted by said light source is a device for controlling a waveform of a power signal to said light source.

17. An illumination device, comprising:
a plurality of light-emitting diodes arranged in an elongated pattern and emitting light of a predetermined first color; and
a light color conversion system, including:
a substantially rod-like member having a predetermined length, a light-receiving surface along the length of said rod-like member, and a light-emitting surface, the light-receiving surface of said rod-like member being positioned adjacent the light-emitting diodes for receiving light from the light-emitting diodes; and
phosphorescing dye contained in said substantially rod-like member, said phosphorescing dye for emitting light of a predetermined hue following absorption of light from said light-emitting diodes, wherein light observed along the light-emitting surface of said rod-like member is perceived as having a color different than the predetermined first color of light emitted by said light-emitting diodes.

18. The illumination device as recited in claim 17, wherein said substantially rod-like member is composed of a material that has both optical waveguide and light scattering properties, resulting in an elongated and substantially uniform light intensity pattern on the light-emitting surface of said rod-like member along said predetermined length.

19. An illumination device comprising:
a plurality of light-emitting diodes (LEDs) for emitting light of a predetermined first hue;
a light-transmitting medium composed of a matrix of substantially translucent material doped with a predetermined density of phosphorescent dye, said light-transmitting medium positioned adjacent said plurality of LEDs for receiving said light of said first hue, converting a portion of said light of said first hue to a second hue, and emitting light of said second hue; and
a waveguide positioned adjacent said light-transmitting medium, said waveguide having a light-receiving surface and a light-emitting surface, said waveguide having both optical waveguide and light scattering properties;
wherein a portion of said light of said first hue passes around the light-transmitting medium and reaches said waveguide directly, without passing through said light-transmitting medium; and
wherein said light of said first hue and light of said second hue are received by the light-receiving surface of said waveguide and mixed to create a perceived hue along the light-emitting surface of said waveguide.

20. An illumination device for simulating neon or similar lighting comprising:
a light source for emitting light of a predetermined first hue;
a light-transmitting medium composed of a matrix of substantially translucent material having a first region that is substantially transparent, a second region that is doped with a predetermined density of a first phosphorescent dye, and a third region that is doped with a predetermined density of a second phosphorescent dye, said light-transmitting medium positioned adjacent said light source for receiving said light of said first hue, and emitting:
light of said first hue passing through said first region;
light of a second hue converted by said first phosphorescent dye from said second region; and
light of a third hue converted by said second phosphorescent dye from said third region; and
an elongated, rod-like waveguide positioned adjacent said light-transmitting medium, said waveguide having a light-receiving surface and a light-emitting surface, said waveguide having both optical waveguide and light scattering properties, whereby said light of said first hue, light of said second hue, and light of said third hue are received by the light-receiving surface of said waveguide, mixed to create a perceived hue and a substantially uniform intensity, and emitted at the light-emitting surface of said waveguide to simulate neon lighting.

21. An illumination device, comprising:
a plurality of light-emitting diodes emitting light of a predetermined first color; and a light color conversion system, including:
  a light-receiving surface positioned adjacent said light-emitting diodes;
  a light-emitting surface; and
  phosphorescing dye emitting light of a predetermined hue following absorption of light from said light-emitting diodes, wherein light observed along the light-emitting surface of said light color conversion system is perceived as having a color different than the predetermined first color of light emitted by said light-emitting diodes;
a substantially rod-like member having a predetermined length, a light-receiving surface and a light-emitting surface, said rod-like member being composed of a material that has both optical waveguide and light scattering properties, the light-receiving surface of said rod-like member being positioned adjacent the light-emitting surface of said light color conversion system for receiving light from the light-emitting surface of the light color conversion system, the light-emitting surface of the rod-like member for emitting said light with a substantially uniform intensity distribution to simulate neon lighting; and
a housing extending substantially the predetermined length of said rod-like member and housing said plurality of light-emitting diodes and associated electrical accessories.

22. The illumination device as recited in claim 21, wherein said housing generally comprises a pair of side walls that define an open-ended channel, said plurality of light-emitting diodes being received and housed in said open-ended channel.

23. An illumination device, comprising:
  a light source emitting light of a predetermined first hue;
  a substantially rod-like member having a predetermined length and positioned adjacent said light source, said member being composed of a material that has both optical waveguide and light scattering properties so as to preferentially scatter light along the length of said rod-like member;
  a light-transmitting medium generally composed of a matrix of light-transmitting material and a phosphorescing dye, said light-transmitting medium including a light-receiving surface for receiving light emitted from said light source and a light-emitting surface for emitting light into said rod-like member, said phosphorescing dye emitting light of a second hue following absorption of light from said light source, wherein a collective light ultimately emitted from said rod-like member has a substantially uniform intensity along the length of said rod-like member; and
  a housing extending substantially the predetermined length of said rod-like member and housing said light source and associated electrical accessories.

24. The illumination device as recited in claim 23, wherein said housing generally comprises a pair of side walls that define an open-ended channel, said light source being received and housed in said open-ended channel.

25. The illumination device as recited in claim 24, wherein said side walls further have internal surfaces having light collection surfaces, said light collection surfaces collecting and reflecting light into said light-transmitting medium.

* * * * *